United States Patent [19]

Yuasa et al.

[11] Patent Number: 4,914,366

[45] Date of Patent: Apr. 3, 1990

[54] POSITIONING CONTROL SYSTEM

[75] Inventors: Yasuhiro Yuasa; Akira Yamashita, both of Tokyo, Japan

[73] Assignee: Kabushiki Kaisha SG, Tokyo, Japan

[21] Appl. No.: 243,803

[22] Filed: Sep. 13, 1988

[30] Foreign Application Priority Data

Sep. 15, 1987 [JP] Japan .............................. 62-230056
Mar. 24, 1988 [JP] Japan .............................. 63-68283

[51] Int. Cl.$^4$ ............................................. G05B 5/01
[52] U.S. Cl. .................................. 318/612; 324/225; 318/632; 318/758
[58] Field of Search ................. 318/612, 632, 758; 324/225

[56] References Cited

U.S. PATENT DOCUMENTS 4,651,073  3/1987  Shimizu et al. ..................... 318/632
4,804,913  2/1989  Shimizu et al. ..................... 324/208

Primary Examiner—William M. Shoop, Jr.
Assistant Examiner—Saul M. Bergmann
Attorney, Agent, or Firm—Spensley Horn Jubas & Lubitz

[57] ABSTRACT

A plurality of speed-sliding compensation amount functions are stored in a sliding compensation amount data memory and one of these functions is selected in response to input of a selection signal. In the selected function, sliding compensation amount data corresponding to the speed of the object of positioning is read out. At least one of current position data and positioning target position data of the object is corrected by the read out sliding compensation amount data. A brake signal is generated on the basis of comparison of the current position data and target position data which have been subjected to this correction and a positioning control of the object is performed by this brake signal. On the other hand, a sliding amount detection circuit is provided for detecting sliding amount of the object from generation of the brake signal until actual stop of the object. The speed detected by a speed detector during generation of the brake signal is stored and, in accordance with the stored speed data and the detected sliding amount data, the selection signal for selecting the speed-sliding compensation amount function in the sliding compensation amount data memory is generated.

12 Claims, 6 Drawing Sheets